United States Patent [19]
Oranje

[11] 3,822,533
[45] July 9, 1974

[54] DEVICE FOR REMOVING IMPURITIES FROM GASES

[75] Inventor: Leendert Oranje, Marsmanhof 4, Haren, Netherlands

[73] Assignee: N.V. Nederlandse Gasunie, Groningen, Netherlands

[22] Filed: Mar. 2, 1973

[21] Appl. No.: 337,540

[30] Foreign Application Priority Data
Mar. 4, 1972 Netherlands.......................... 722901

[51] U.S. Cl........................ 55/394, 55/426, 55/456
[51] Int. Cl............................................ B01d 45/00
[58] Field of Search...................... 55/42, 184, –186, 55/392, 394, 424, 426, 456–459

[56] References Cited
UNITED STATES PATENTS
| | | | |
|---|---|---|---|
| 1,055,792 | 3/1913 | Plock | 55/426 |
| 1,938,849 | 12/1933 | Maxim et al. | 55/426 X |
| 2,542,635 | 2/1951 | Davis et al. | 55/426 X |
| 2,846,024 | 8/1958 | Bremi | 55/426 X |
| 2,918,139 | 12/1959 | Silverman | 55/457 X |

Primary Examiner—Frank A. Spear, Jr.
Assistant Examiner—Richard W. Burks
Attorney, Agent, or Firm—Cushman, Darby & Cushman

[57] ABSTRACT

An improved separator of the type having a cylindrical vessel, a feed tube extending into the vessel normal to its axis, an axial discharge tube and a first plate mounted perpendicular to the vessel axis under the axial discharge tube. To avoid undue wear on the separator bottom, a second plate is mounted beneath the first plate, which may be conical at specific distances and having specific dimensions.

3 Claims, 4 Drawing Figures

PATENTED JUL 9 1974 3,822,533

DEVICE FOR REMOVING IMPURITIES FROM GASES

The invention relates to an apparatus for separating solids and/or liquids from a stream of gas.

Cylinder-shaped separators are used in particular in cases where materials have to be removed from gases at high pressures, e.g., pressures of over 50 Bar. Typically such separators consist of a cylindrical vessel, a feed tube extending normal to the vessel axis, an axial discharge tube surrounded by blade-shaped means for imparting a rotary motion to the gas and a first plate mounted perpendicular to the vessel axis and under the axial discharge tube. These separators are described, e.g., in Jackson R., Mechanical Equipment for Removing Grit and Dust from Gases, Leatherhead, 1963 (see, for instance, page 117, FIG. V 3, and pages 167 and 168). Such devices have the drawback that the separated materials are in violent rotation at the bottom of the vessel during operation. This causes the bottom and the inner wall near the bottom to be worn off and makes it difficult to discharge the separated materials. It has been found that this wear of the bottom may seriously reduce the wall thickness of the bottom, so that even a dangerous situation may arise in the case of pressure vessels.

An article by Van Ebbenhorst Tengbergen H.J., "The Separation of Liquids from Gases by Cyclones," in the book Cyclones in Industry, edited by Rietema and Verver, Amsterdam, 1961, pages 90–91, specifically mentions that material separated at the bottom by the vortex formation can be entrained in the discharge. This can be remedied, according to the article, by mounting baffle plates on the bottom or by mounting a 'false bottom' which is not in contact with the wall of the vessel. Model tests, however, have shown that - particularly at high gas rates - the above problem is not solved, because the vortex forms over the baffle plates and over the false bottom, so that the zone of wear is only shifted. A centrifugal separator - in which under the discharge conduit a circular plate has been fitted, under which plate further means are provided for setting at rest the liquid separated off - is described in the Dutch Pat. Application No. 6,805,775 laid out for inspection on 25th Oct., 1968. This separator separates relatively large amounts of liquid from gas, in which the difficulties mentioned above do not occur.

The invention of this application relates to a separator as described in the opening paragraph, in which the separated solid and/or liquid come(s) to almost complete rest at the bottom and local wear is avoided.

According to the invention this is achieved by providing a second plate having a circular outer rim whose external diameter is smaller than the internal diameter of the cylindrical vessel, and which plate is positioned at a distance to the first plate amounting to at least 1/8 th of the distance between the plane of the rim of the first plate and the discharge conduit; the shape of the first plate being that of a cone or of a truncated cone with an apex angle between 90° and 180°, the tip of the cone being pointed toward the discharge conduit, the diameter of the first plate being 0.5 to 0.95 times the internal diameter of the cylindrical part of the vessel and 1.5 to 3 times the diameter of the discharge conduit, and the plane in which the rim of the first plate is situated lying at a distance of one to three times, and the highest point of the first plate at least at 0.7 times, the diameter of the discharge conduit from said conduit.

At an apex angle of 180° the first plate having the shape of a (whether or not truncated) cone changes into a flat, circular plate. This embodiment, therefore, also forms part of the invention. Preference is given to an apex angle of about 120°. The minimum distance of 0.7 times the diameter of the discharge conduit between the highest point of the first plate and the underside of the discharge conduit is necessary to obtain the required passage for the gas stream.

According to the invention, the second plate may be annular and have an inner diameter of at least 0.5 times that of the first plate, its outer rim being at most at about 25 mm from the inner wall of the cylindrical part of the vessel, and which is mounted under the first plate at a distance therefrom of 1/8 to ½ times the distance from the plane of the rim of the first plate to the discharge conduit.

Between the annular plate and the inner wall of the vessel a slot of up to about 25 mm wide is left free to allow coarse solid particles to pass.

According to another embodiment the circular second plate has a diameter of 0.5 to 0.95 times the internal diameter of the cylindrical part of the vessel, and is mounted under the first circular plate at a distance of at least one half and at most 3/2 times the diameter of the cylindrical part of the vessel, and under which one or more approximately radial baffles are mounted whose height in the cylindrical part of the vessel amounts to 1/8 to ½ of the diameter of the cylindrical part of the vessel.

The last embodiment, to a certain extent, be compared to the 'false bottom' from the above-mentioned publication. The use of the second plate, however, cannot be considered independent of the first plate mounted under the discharge conduit. Hence, it is specifically stated that the result aimed at can only be achieved by using the first plate in combination with the second plate for setting the separated materials at rest, as described above.

The invention will be elucidated with reference to the drawings, where:

Corresponding parts in the four figures are indicated by the same reference figures.

Figure 1:
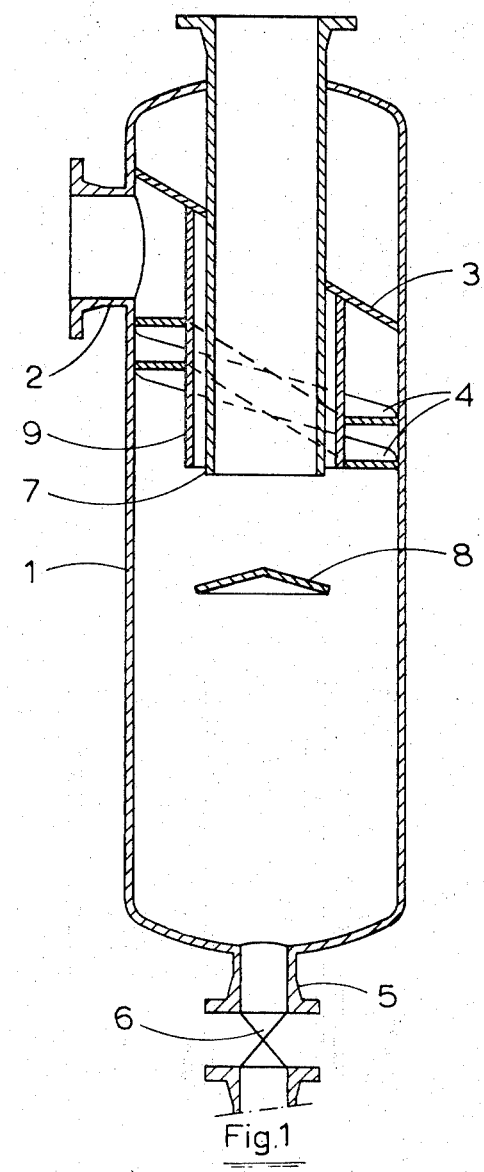
FIG. 1 shows a vertical section through a dust separator of known design.

In the conventional separator shown in FIG. 1, the gas to be purified is fed to the cylindrical part 1 of the separator through conduit 2. The gas flows along guide plate 3 and through the blade system of screw-blades 4 and is thus set in rapid rotation. The solid and/or liquid materials separated along the wall collect at the bottom of the separator, where they are still in violent rotation and thus cause severe wear of the bottom and the inner wall near the bottom. The material separated is discharged through conduit 5 by means of valve 6, while the purified gas is discharged through discharge conduit 7. To prevent separated material from being sucked into discharge conduit 7, a plate 8, which is often slightly conical, is mounted under discharge conduit 7. In FIG. 1 discharge conduit 7 is directed axially upwards but may also be fitted laterally over guide plate 3, e.g., opposite the feed 2. Furthermore, a protective jacket 9 is mounted around discharge conduit 7. The lower edge of this jacket 9 is slightly higher than that of the discharge conduit 7 and a cylindrical slot is left between these parts. The object of jacket 9 is to prevent the outer surface of conduit 7 from being covered with a film of liquid from the gas, which film would reach the inner side of the discharge conduit 7 along the surface.

It should be noted that the structure for fixing the parts into place is not indicated in any of the Figures to avoid cluttering the drawings.

Figure 2:
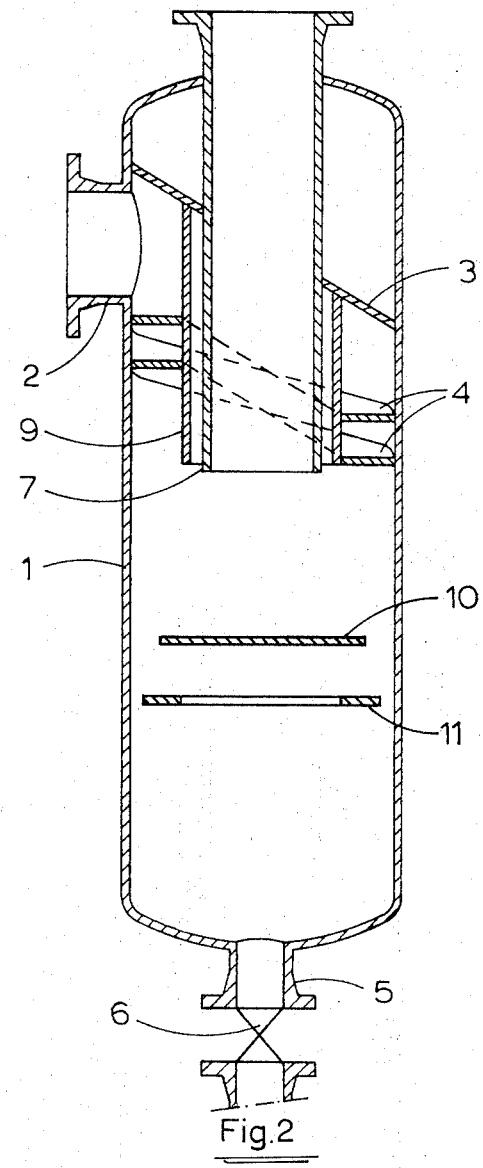
FIG. 2 shows a vertical section through an embodiment according to the invention, provided with the annular second plate.

FIG. 2 shows an embodiment of a separator according to this invention. The parts indicated by the references 1 through 9 correspond to the parts in FIG. 1 having the same reference figures. According to this embodiment, a circular, flat first plate 10 is mounted under discharge conduit 7. Furthermore, an annular plate 11 is fitted under circular plate 10 according to the invention. The figure shows that there is some space between the annular plate 11 and the adjacent wall of the vessel.

The dimensions of circular plate 10 and annular plate 11 and their positions with respect to each other and to the other parts of the separator are consistent with the limiting numerical values mentioned in the description of the invention.

Figure 3:
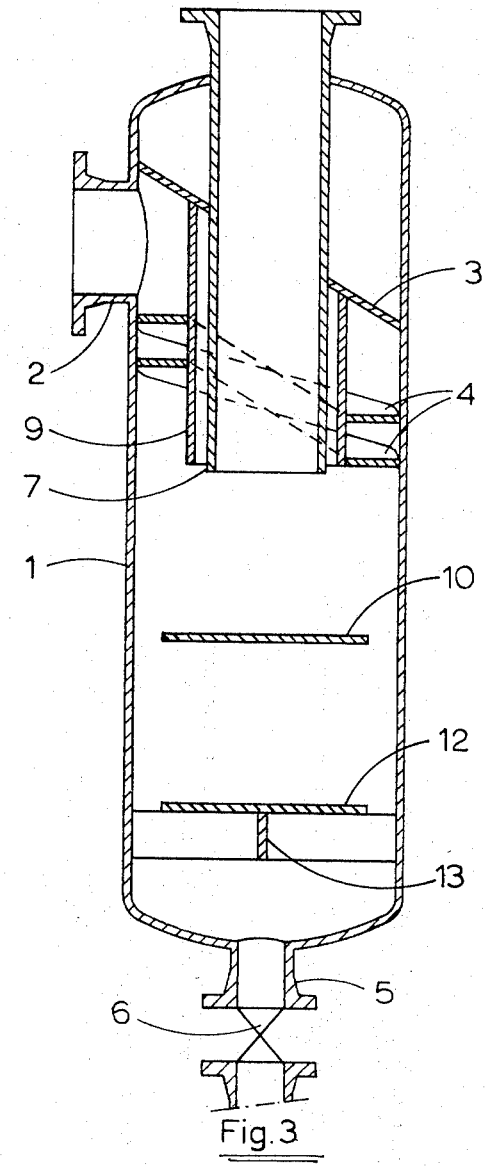
FIG. 3 shows a vertical section through an embodiment according to the invention, fitted with the circular second plate and radial baffles.

In the separator according to the second embodiment of the invention, which is shown in FIG. 3, a second circular plate 12 is mounted under the circular plate 10. Under the second circular plate, one or more approximately radial baffles 13 are provided in the cylindrical part 1 of the vessel. Here, too, the dimensions of circular plates 10 and 12 and baffles 13 and their positions with respect to each other and to the other parts of the separator are consistent with the numerical values mentioned in the description.

Figure 4:
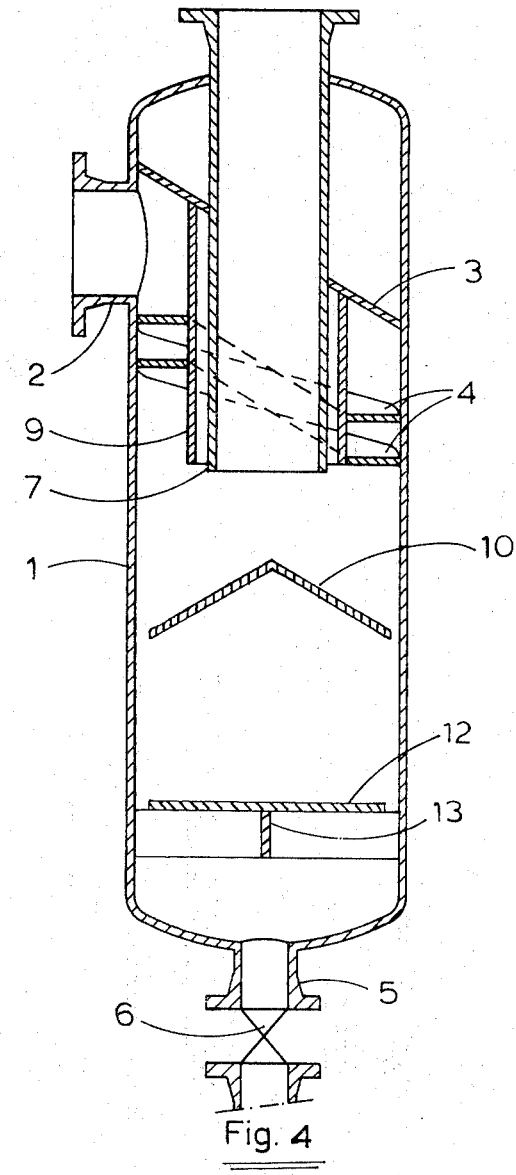
FIG. 4 shows a vertical section through an embodiment according to the invention, fitted with the circular second plate and radial baffles as in FIG. 3, now provided, however, with a conical first plate.

The separator according to the embodiment shown in FIG. 4 differs from the one shown in FIG. 3 only in that the first plate 10 is not flat, but conical.

It should be noted that the baffles 13 may, if so desired, extend into the bowl-shaped part of the bottom. Many other changes and modifications of the above described embodiment of the invention are of course possible without departing from the scope thereof. Accordingly, that scope is intended to be limited only by the scope of the appended claims.

What is claimed is:

1. In an apparatus for separating solids and/or liquids from a gas stream having a cylindrical vessel, a feed tube extending normal to the axis of said vessel, an axial discharge conduit which protrudes into the vessel and is surrounded by blade-shaped means for imparting a rotary motion to the gas fed in and under which a first plate is mounted having a circular outer rim which lies in a plane normal to the axis of the vessel, under which first plate further means are installed for setting the substances separated off at rest, the improvement wherein said further means comprises at least a second plate having a circular outer rim whose external diameter is smaller than the internal diameter of said cylindrical vessel, and which second plate is positioned under said first plate at a distance amounting to at least 1/8th of the distance between the plane of the rim of the first plate and said discharge conduit, the shape of said first plate being that of a cone or of a truncated cone with an apex angle between 90° and 180°, the tip of the cone being pointed toward said discharge conduit, diameter of the first plate being 0.5 to 0.95 times the internal diameter of the cylindrical part of the vessel and 1.5 to 3 times the diameter of the discharge conduit, and the plane in which the rim of the first plate is situated being at a distance of one to three times, and the highest point of the first plate at least 0.7 times, the diameter of said discharge conduit from said conduit.

2. In an apparatus according to claim 1, the further improvement wherein said further means comprises an annular second plate having an inner diameter of at least 0.5 times that of said first plate, an outer rim at most at about 25 mm from the inner wall of the cylindrical part of the vessel, and mounted under said first plate at a distance therefrom of 1/8 to ½ times the distance from the plane of the rim of said first plate to said discharge conduit.

3. In an apparatus according to claim 1, the further improvement wherein said circular second plate has a diameter of 0.5 to 0.9 times the internal diameter of the cylindrical part of said vessel, is mounted under the first plate at a distance of at least one half and at most 3/2 times the diameter of the cylindrical part of said vessel and under which circular second plate one or more approximately radial baffles are mounted whose height in the cylindrical part of the vessel amounts to 1/8 to ½ of the diameter of the cylindrical part of the vessel.

* * * * *